(12) United States Patent
Böhm et al.

(10) Patent No.: US 12,726,011 B2
(45) Date of Patent: Sep. 1, 2026

(54) ASSEMBLY FOR POTENTIAL EQUALIZATION IN POTENTIALLY EXPLOSIVE AREAS

(71) Applicant: DEHN SE, Neumarkt i.d.OPf. (DE)

(72) Inventors: Thomas Böhm, Hohenfels (DE); Richard Daum, Neumarkt (DE); Michael Waffler, Neumarkt/Opf. (DE); Dominik Meier, Parsberg (DE); Christian Lang, Greding (DE)

(73) Assignee: DEHN SE, Neumarkt i.d.OPf. (DE)

( * ) Notice: Subject to any disclaimer, the term of this patent is extended or adjusted under 35 U.S.C. 154(b) by 151 days.

(21) Appl. No.: 18/734,544

(22) Filed: Jun. 5, 2024

(65) Prior Publication Data

US 2024/0421579 A1 Dec. 19, 2024

(30) Foreign Application Priority Data

Jun. 16, 2023 (EP) .................................... 23179838

(51) Int. Cl.
*H02G 13/00* (2006.01)

(52) U.S. Cl.
CPC ............. *H02G 13/80* (2013.01); *H02G 13/40* (2013.01); *H02G 13/60* (2013.01)

(58) Field of Classification Search
CPC ........ H02G 13/80; H02G 13/40; H02G 13/60; H01T 1/12; H01T 1/14; H01T 4/02; H01T 4/00; H01H 2037/762; H01H 37/761
See application file for complete search history.

(56) References Cited

U.S. PATENT DOCUMENTS 4,062,054 A 12/1977 Simokat ........................ 361/119
4,132,915 A 1/1979 Wilms .......................... 313/325
2016/0013631 A1 1/2016 Ehrler et al. ................. 361/91.1
2023/0036343 A1* 2/2023 Gäck .................... H01H 3/0213
2024/0006870 A1* 1/2024 You ...................... H01H 37/761
2024/0087831 A1* 3/2024 Topcagic ............. H01H 85/055
2024/0296979 A1* 9/2024 Mouton ................... H01H 9/32

FOREIGN PATENT DOCUMENTS

CN 211907369 U * 11/2020
DE 2738077 A1 3/1978 ............... H01T 1/14
DE 2740695 A1 11/1978 ............... H01T 1/14
DE 202013002222 U1 6/2013 ............... H02H 9/06
DE 102014016938 B3 2/2016 ............... H01C 7/12

(Continued)

*Primary Examiner* — Daniel Cavallari
(74) *Attorney, Agent, or Firm* — Bodner & Bodner, PLLC; Christian P. Bodner; Gerald T. Bodner

(57) ABSTRACT

An assembly (10) for potential equalization in potentially explosive areas is described, having an outer housing (20), a gas discharge arrester (22), a short-circuiting device (30) and a fault indicator (42). At least the gas discharge arrester (22) and the short-circuiting device (30) are accommodated in the outer housing (20). The short-circuiting device (30) comprises at least one spring (32) and an actuating element (34), which is preloaded into a short-circuit position by the spring (32). The gas discharge arrester (22) has a base body (24) which is filled with a gas and connected to a first connecting part (16) via a thermally detachable connection (38). The fault indicator (42) is set up to indicate a tripping event of the short-circuiting device (30).

17 Claims, 3 Drawing Sheets

(56) References Cited

FOREIGN PATENT DOCUMENTS

| | | | | | |
|---|---|---|---|---|---|
| EP | 0603428 A1 | | 6/1994 | ............... | H01T 1/14 |
| EP | 3605574 A1 | | 2/2020 | ............. | H01H 37/76 |
| EP | 3605574 B1 | | 11/2020 | ............. | H01H 37/76 |
| EP | 4270686 B1 | * | 11/2024 | ............... | H01T 4/16 |
| WO | WO2019220171 A1 | | 11/2019 | ............... | H01C 7/12 |
| WO | WO-2023165761 A1 | * | 9/2023 | ............... | H01T 4/04 |

* cited by examiner

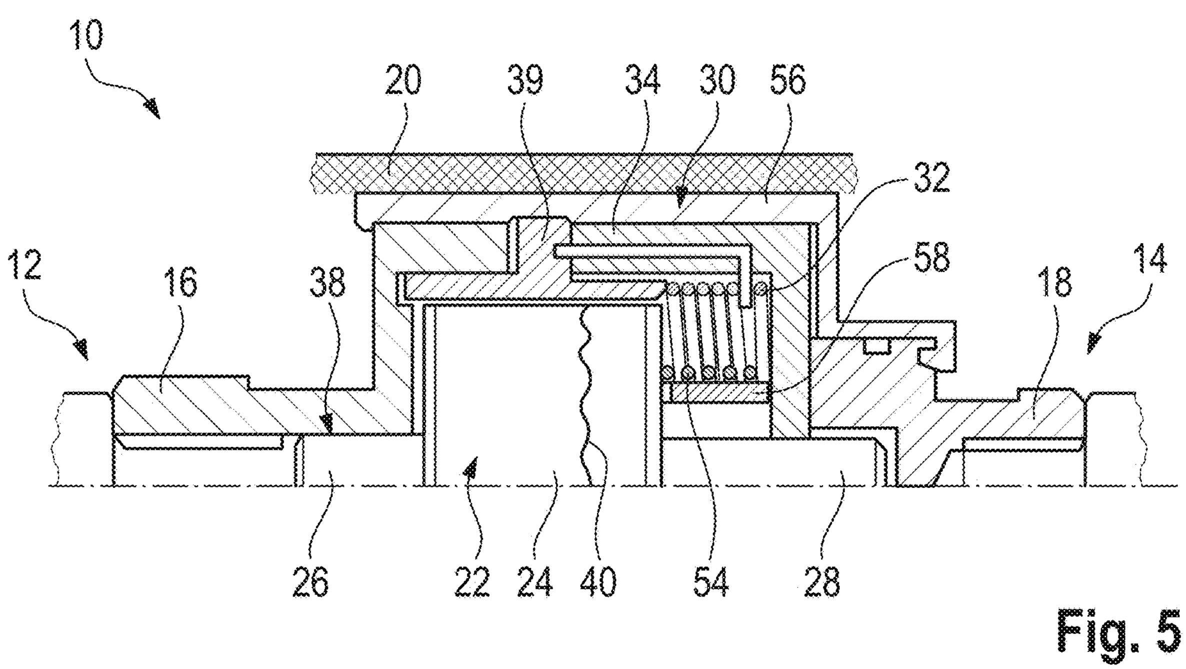
Fig. 5
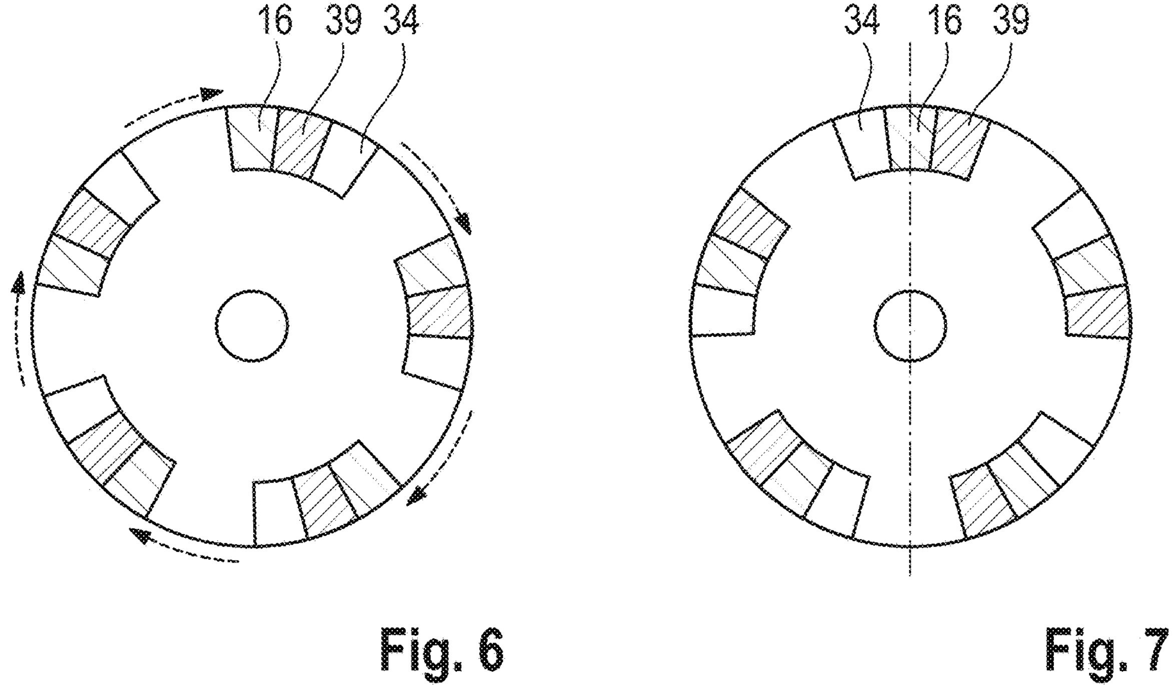
Fig. 6
Fig. 7

ASSEMBLY FOR POTENTIAL EQUALIZATION IN POTENTIALLY EXPLOSIVE AREAS

FIELD OF THE DISCLOSURE

Embodiments of the present disclosure relate to an assembly for potential equalization in potentially explosive areas.

BACKGROUND

Assemblies for potential equalization in potentially explosive areas (Ex areas), which are provided for lightning protection, are known from the state of the art.

The corresponding assemblies are usually used to bridge insulating pieces, insulating flanges or similar, so that system components of a system which are otherwise isolated from each other are earthed when exposed to lightning, which can effectively prevent damage caused by lightning. One example of such an assembly is the EXFS100 from Dehn SE.

In addition to the typical function of such an assembly, namely to ensure an electrical line in the event of lightning, such an assembly must also be able to generate a short circuit in the event of a fault, so that the assembly is electrically conductive in the event of a fault, as a result of which the system components of the system which are otherwise isolated from each other are permanently earthed.

It has been found with such assemblies that it is not readily apparent to a user whether the assembly is still fully functional or whether there is a fault and the assembly is permanently short-circuited.

As already explained above, the assemblies are designed such that a short circuit is generated in the event of a fault. However, it is not readily apparent to the user whether this is actually the case. The user must also rely on the fact that the assembly is functional in the event of a fault to the extent that the short circuit via the assembly is actually present in the event of a fault in the assembly. For this reason, it must be ensured with some effort in such assemblies that a short circuit is actually generated in the event of a fault, to earth the system components, which are otherwise isolated from each other, in the event of a fault.

The object of the present disclosure is to improve the functionality of such an assembly, i.e. to make the assembly simpler and more cost-effective, and at the same time to make it more user-friendly.

SUMMARY

According to the present disclosure, the object is achieved by an assembly for potential equalization in potentially explosive areas, having an outer housing, a gas discharge arrester, a short-circuiting device and a fault indicator. At least the gas discharge arrester and the short-circuiting device are accommodated in the outer housing. The short-circuiting device comprises at least one spring and an actuating element, which is preloaded into a short-circuit position by the spring. The gas discharge arrester has a base body which is filled with a gas and connected to a first connecting part via a thermally detachable connection. The fault indicator is set up to indicate a tripping event of the short-circuiting device.

The basic idea is to provide the assembly for potential equalization with a short-circuiting device which becomes active in particular in the event of a fault in the assembly, so that the assembly is also electrically conductive in the event of a fault. System components connected to the assembly can therefore be earthed. It is thus ensured that there is always a short circuit in the event of a fault in the assembly, so that system components of a system which are separated from each other are short-circuited via the assembly, as a result of which they are earthed accordingly.

The fault indicator also ensures that the fault event, which is associated with the tripping event of the short-circuiting device, is indicated so that a user can quickly detect the state of the assembly, in particular that of the short-circuiting device.

Among other things, the short-circuiting device is set up to become active in the event of a high short-term overload, i.e. to generate a short circuit. Such a high short-term overload results, for example, in the base body of the gas discharge arrester being damaged or destroyed, which activates the short-circuiting device and creates a short circuit.

The thermally detachable connection also ensures that the assembly can ensure potential equalization also in the event of a long-lasting, low overload, as the thermally detachable connection becomes detached due to the long-lasting, low overload. If the thermally detachable connection becomes detached, a short circuit is also generated, which accordingly ensures potential equalization.

The short-circuiting device therefore also comprises the thermally detachable connection in addition to the spring and the actuating element, as a short circuit is also generated when the thermally detachable connection is detached.

The assembly, in particular the short-circuiting device, thus comprises a combined tripping mechanism which reacts both in the event of a high, short-term overload and in the event of a long-lasting, low overload to ensure potential equalization.

Generally, the tripping mechanism is achieved by the spring preloading the actuating element (directly or indirectly) into the corresponding short-circuit position in which a short circuit is generated. Accordingly, the actuating element generates the short circuit if the base body has been damaged or destroyed and/or the thermally detachable connection has become detached.

The short-circuiting device is therefore in particular set up to become active if the base body of the gas discharge arrester is at least damaged, i.e. if there is a fault in the assembly. An at least damaged base body of the gas discharge arrester which is damaged or even destroyed.

The short-circuiting device therefore ensures that a short-circuit is also present in the event of a fault in the assembly, in particular that the gas discharge arrester is short-circuited, i.e. if the base body of the gas discharge arrester is at least damaged.

In this respect, several different fault scenarios are covered by the assembly, in particular by the short-circuiting device, namely a short-term high overload and a low long-term overload.

In addition, the gas discharge arrester ensures that the assembly provides the desired potential equalization if there is a potential difference which can be discharged by the gas discharge arrester, which corresponds to the regular operation of the assembly, i.e. a regular overload.

Basically, the gas discharge arrester provides an isolating spark gap (EXFS).

One aspect provides that the actuating element is mounted so as to be movable relative to the outer housing. The actuating element can therefore move relative to the outer housing, as a result of which the short circuit can be generated via the actuating element, as the relative movement can result in a contact between two components of the assembly via which the short circuit is generated.

If the actuating element partially protrudes from the outer housing at least in the short-circuit position or in the event of tripping, or if the outer housing has a corresponding viewing window, a user can quickly determine whether the actuating element is in the short-circuit position or not. In this respect, the actuating element itself can already form the fault indicator.

A further aspect provides that the actuating element is connected, in particular screwed to a second connecting part. The second connecting part is provided substantially in the opposite direction to the first connecting part, in particular with respect to the gas discharge arrester. Consequently, a first end of the gas discharge arrester is connected to the first connecting part, whereas a second end of the gas discharge arrester, opposite the first end, is connected to the second connecting part. In other words, the two connecting parts are separate from each other and are only coupled to each other via the gas discharge arrester. The two connecting parts are therefore not directly connected to each other, so that relative movement between the two connecting parts is basically possible if the connection to the gas discharge arrester is interrupted and/or the gas discharge arrester is damaged.

The first connecting part and the second connecting part are therefore spaced apart from each other in an initial position of the assembly, namely by the gas discharge arrester located therebetween.

In one embodiment, the actuating element has at least one annular or cylindrical section. For example, the actuating element is (substantially) pot-shaped, the base having an opening.

The corresponding section of the actuating element may have an internal thread at the end, with which an external thread of the second connecting part interacts to form a threaded connection between the actuating element and the second connecting part.

It is in particular provided that the at least one spring acts on the second connecting part. In this respect, the actuating element is preloaded into the short-circuit position via the second connecting part. The spring presses the second connecting part in the direction of the short-circuit position, the second connecting part, which is connected to the actuating element, urging, for example pulling, the actuating element in the direction of the short-circuit position. Overall, the spring thus preloads the actuating element into the short-circuit position.

For example, the at least one spring is a compression spring. The compression spring is therefore supported on a component of the assembly to exert pressure on the second connecting part.

Furthermore, it may be provided that the short-circuiting device comprises a compression spring and/or a torsion spring. Consequently, two different types of spring may be provided which ensure that a desired movement of the actuating element takes place if there is a fault in the assembly. It is also possible to provide only a torsion spring, which results in a rotation of the actuating element which is only possible if, for example, the gas discharge arrester, in particular the base body thereof, is damaged or destroyed. In other words, the torsion spring can be arranged such that the actuating element is rotated, this rotation being only possible if the gas discharge arrester, in particular the base body thereof, is damaged or destroyed. The movement of the actuating element results in a short circuit. In particular, the movement of the actuating element is initiated due to a short-term high overload or a long-term overload, which trips the short-circuiting device.

In principle, the compression spring can also ensure that an occurring crack of the gas discharge arrester, in particular in the base body of the gas discharge arrester, results in a rupture of the gas discharge arrester, in particular of the base body, so that there are at least two parts which are separated from each other. The torsion spring can then rotate the at least two parts relative to each other. The force exerted by the compression spring therefore ensures that a weakening of the gas discharge arrester, in particular the base body, leads to a rupture due to a crack. Even in the event of a crack, functionality can no longer be fully ensured, so that complete destruction and tripping of the short-circuiting device is advantageous.

A further aspect provides that a short circuit is formed via the first connecting part and the actuating element in a tripping event of the short-circuiting device, which contact each other in the event of tripping. In the event of tripping, i.e. when the actuating element is in the short-circuit position, there is therefore contact between the actuating element and the first connecting part, which creates the short circuit. Among others, this is due to the fact that the outer housing is firmly connected to the first connecting part and the actuating element is connected to the second connecting part. When the short-circuiting device is tripped, there is a relative movement of the actuating element to the outer housing, which therefore also results in a relative movement of the two connecting parts. Nevertheless, there is no direct contact between the two connecting parts in a tripping event of the device, but only indirect contact via the actuating element. In other words, the two connecting parts, which are spaced apart and electrically insulated from each other in the initial state, are still spaced apart in the event of tripping, but are electrically connected to each other via the actuating element. A current can therefore flow from the first connecting part via the actuating element to the second connecting part.

The fault indicator is in particular designed as a mechanical fault indicator. This means that the fault indicator is tripped purely mechanically in the event of tripping, i.e. no electrical signal is sent to the fault indicator. For this purpose, it may be provided in a simple way that the fault indicator is designed as part of the actuating element or is directly mechanically coupled to the actuating element, as a result of which a displacement of the actuating element results in a displacement of the fault indicator, which makes the corresponding state visible to the user.

For example, the fault indicator is provided on an outwardly facing surface of the actuating element, which is visible from the outside when tripped. The surface may be a marked section which is visible from the outside in the short-circuit position. The section is for example marked with a signal color. This corresponding section, which forms the fault indicator, is therefore covered by the outer housing in the initial position, wherein the corresponding section becomes visible from the outside in the short-circuit position, so that a user can directly detect the state of the short-circuiting device and thus the state of the assembly. For this purpose, it may be provided that the relative movement of the actuating element to the outer housing causes the marked section to exit the outer housing. Alternatively, a viewing window may be provided in the outer housing, e.g. a translucent or transparent area in which the marked section is positioned in the event of tripping, so that the marked section is visible from the outside through the viewing window.

In particular, the viewing window makes it possible to provide a hermetically sealed outer housing in which the actuating element can move.

Furthermore, the fault indicator can basically be suitable for outdoor installation. Accordingly, the fault indicator can withstand environmental influences.

The outer housing and/or the connecting parts are designed, in particular sealed, such that the assembly has an IP protection level which prevents the ingress of water and foreign bodies both in the tripped and the non-tripped state. At the same time, however, the movement capability of the short-circuiting device is ensured, which guarantees the short-circuiting functionality in the event of a fault.

According to a further aspect, the first connecting part is firmly connected to the outer housing. This ensures that there is no relative movement between the first connecting part and the outer housing.

A further aspect provides that the base body is at least partially surrounded by an insulating body on which the at least one spring is supported and/or along which the actuating element is movably mounted and/or to which the first connecting part is firmly connected. The insulating body ensures electrical insulation between the base body of the gas discharge arrester and the actuating element in the initial state. In addition, the actuating element is mounted in a defined manner within the outer housing via the insulating body, in particular a defined distance is set between the base body of the gas discharge arrester and the actuating element. At the same time, the insulating body serves as a plain bearing for the actuating element so that the actuating element can move relative to the insulating body. In addition, the spring can be clamped between the insulating body and the second connecting part so that the spring is supported on the insulating body and presses the second connecting part in the direction of the short-circuit position. Furthermore, the insulating body can be firmly connected to the first connecting part so that the insulating body is fixed in relation to the first connecting part and also the outer housing, as the outer housing is connected to the first connecting part. A nonpositve and/or positive fit may be provided for the connection of the insulating body and the first connecting part. In addition, the insulation body can also be connected to the first connecting part by an intermaterial bond.

In principle, the connecting parts may also be referred to as inner housing parts, particularly in relation to the outer housing which surrounds the two connecting parts at least in some areas.

The assembly can also include a remote signaling equipment which is set up to monitor the state of the assembly. In particular, the remote signaling equipment comprises a sensor which interacts with the outer housing or the actuating element. The remote signaling equipment basically serves to signal the state of the assembly at a different location, so that the user does not necessarily have to be on site to perceive the fault indication. The remote signaling equipment may include a microswitch which represents the sensor. The microswitch can transmit the state of the assembly by means of tactile actuation. It may be provided that the sensor, i.e. the microswitch, interacts with the outer housing, in particular in the initial state. The sensor is mounted such that the sensor is moved away from the outer housing in the event of tripping, namely due to the movement of the actuating element, as a result of which contact with the outer housing is no longer present and a corresponding signal is sent via the remote signaling equipment.

Alternatively, the sensor may be arranged such that the sensor is not actuated in the initial state, but is actuated in the event of tripping, i.e. after the actuating element has moved. The actuation can be performed by the actuating element itself or by an element coupled to the actuating element, a tripping signal being transmitted via the remote signaling equipment, which in turn is representative of the state of the assembly.

It may also be provided that the sensor scans a contour on a moving component of the assembly, e.g. the actuating element and/or the second connecting part. The scanned component of the assembly can be scanned by the sensor outside the outer housing or inside the outer housing.

A further alternative of the sensor provides an inductive sensor which detects a movement of a component of the assembly.

The thermally detachable connection may be a soldered connection. The thermally detachable connection may be a low-solder paste which begins to detach, for example, at a temperature above 100° C., in particular above 130° C., as a result of which the thermally detachable connection is detached.

In particular, the base body of the gas discharge arrester may be made of ceramic. The ceramic can break or crack, resulting in a fault in the assembly, in particular the gas discharge arrester. This breaking or cracking of the base body results in the short-circuiting device being activated, which ensures potential equalization via the short-circuited assembly.

In particular, the outer housing is a plastic housing. It is thus ensured that the outer housing which is arranged outside and surrounds electrically conductive components, is electrically non-conductive.

In principle, a tripping event of the assembly is present when the short-circuiting device has been activated, i.e. the actuating element is in its short-circuit position, in which the short-circuit is established via the actuating element.

The short-circuiting device can have an axial, a rotational or an axial and rotational tripping mechanism, namely due to a compression spring, a torsion spring or a combination of a compression and a torsion spring. The axis is defined by the gas discharge arrester or the connecting line of the connections of the gas discharge arrester.

BRIEF DESCRIPTION OF THE DRAWINGS

Further advantages and features of the claimed subject matter will become apparent from the description below and from the drawings to which reference is made and in which:

FIG. 5 shows a schematic longitudinal sectional view of an assembly according to the present disclosure in accordance with a third embodiment, FIG. 6 shows a schematic cross-sectional view of the assembly according to FIG. 5 in its initial state, which illustrates the operating principle, and FIG. 7 shows a schematic cross-sectional view of FIG. 6 in the event of tripping.

DETAILED DESCRIPTION

Figure 1:
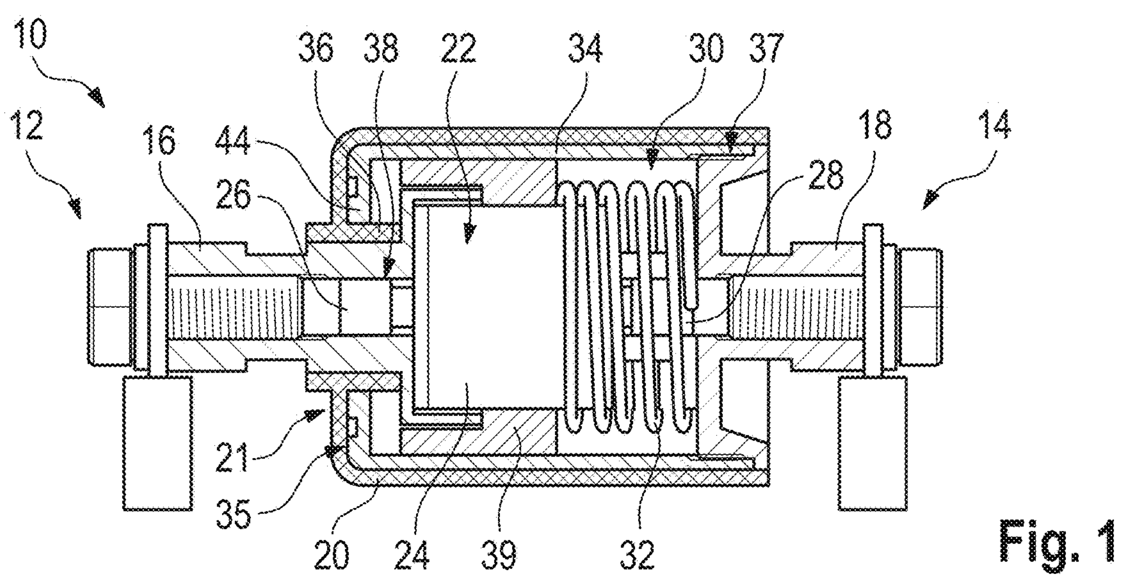
FIG. 1 shows a sectional view of an assembly according to the present disclosure in accordance with one embodiment in an initial state.

FIG. 1 shows an assembly 10 for potential equalization in potentially explosive areas (Ex areas), which is used, for example, to indirectly connect or earth operationally separate system components of a system in the event of lightning.

The assembly 10 comprises a first pole 12, which is for example on the system side, and an opposite second pole 14, which is for example on the field side.

A connecting threaded screw M10 can be provided at each of the poles 12 and 14, via which corresponding system components of the system are electrically connected to the assembly 10.

In addition, the assembly 10 comprises a first connecting part 16, which is assigned to or connected to the first pole 12, and a second connecting part 18, which is assigned to or connected to the second pole 14.

The connecting parts 16, 18 extend at least partially in an outer housing 20, which is designed as a plastic housing (TPE housing), for example as an injection-molded part. The first connecting part 16 and the second connecting part 18, however, are designed as electrically conductive parts, for example metal housing parts. In particular, the outer housing 20 is firmly connected to the first connecting part 16.

In the embodiment shown, the outer housing 20 is (substantially) pot-shaped, with a bottom 21 of the pot-shaped outer housing 20 having an opening through which the first connecting part 16 extends. The second connecting part 18 corresponds to a cover for the pot-shaped outer housing 20.

A gas discharge arrester 22 is provided between the two connecting parts 16, 18, which accordingly distances the two connecting parts 16, 18 from each other. The gas discharge arrester 22 is completely accommodated in the outer housing 20, whereas the two connecting parts 16, 18 are only partially accommodated in the outer housing 20 in the embodiment shown.

The gas discharge arrester 22 has a base body 24 which encloses an area filled with gas. The base body 24 can be formed from a ceramic.

The gas discharge arrester 22 has a first end 26, via which the gas discharge arrester 22 is connected to the first connecting part 16, and a second end 28, opposite to the first end 26, via which the gas discharge arrester 22 is connected to the second connecting part 18.

In this respect, the assembly 10 can form an electrically conductive connection via the first connecting part 16, the gas discharge arrester 22 connected thereto and the second connecting part 18, which is also connected to the gas discharge arrester 22. The electrically conductive connection is provided when the gas discharge arrester 22 is in a conductive state.

In addition, the assembly 10 comprises a short-circuiting device 30, which ensures that a short circuit is present between the otherwise spatially separated connecting parts 16, 18 if the assembly 10, in particular the gas discharge arrester 22, is faulty, i.e. if there is a fault event.

The short-circuiting device 30 comprises a spring 32 and an actuating element 34, which is preloaded into a short-circuit position by the spring 32, as will be explained below.

In the initial state, the outer housing 20 surrounds the actuating element 34, which is also (substantially) pot-shaped, a base 35 of the actuating element 34 having an opening through which the first connecting part 16 extends.

Furthermore, the pot-shaped outer housing 20 has a guide 36 for the edge of the opening in the base 35 of the actuating element 34 in the region of its opening in the base 21.

The actuating element 34 is also connected to the second connecting part 18, for example via a threaded connection 37, so that the second connecting part 18 and the actuating element 34 are mechanically coupled to each other. A movement of the second connecting part 18 thus results in a movement of the actuating element 34 and vice versa.

The short-circuiting device 30 also has at least one thermally detachable connection 38, via which the base body 24 of the gas discharge arrester 22 is connected to the first connecting part 16, for example. In this respect, the thermally detachable connection 38 can be provided in the region of the first end 26 of the gas discharge arrester 22.

In principle, the thermally detachable connection 38 can be provided on all contact surfaces between the gas discharge arrester 22 and the first connecting part 16.

For example, the gas discharge arrester 22 is soldered into the first connecting part 16 via its first end 26, in particular using a low-solder paste.

In addition, the assembly 10 comprises an insulating body 39 which at least partially surrounds the gas discharge arrester 22, in particular the base body 24. The insulating body 39 may have been pushed onto the gas discharge arrester 22.

As shown in FIG. 1, the insulating body 39 is shaped so as to contact, in particular surround, part of the first connecting part 16. It may also be provided that there is a connection between the insulating body 39 and the first connecting part 16, as a result of which a relative movement of the insulating body 39 to the first connecting part 16 can be prevented.

The insulating body 39 is also provided between the gas discharge arrester 22 and the actuating element 34, so that the insulating body 39 determines the position of the actuating element 34 in the outer housing 20 and at the same time acts as a plain bearing for the actuating element 34 when the short-circuiting device 30 trips.

Figure 2:
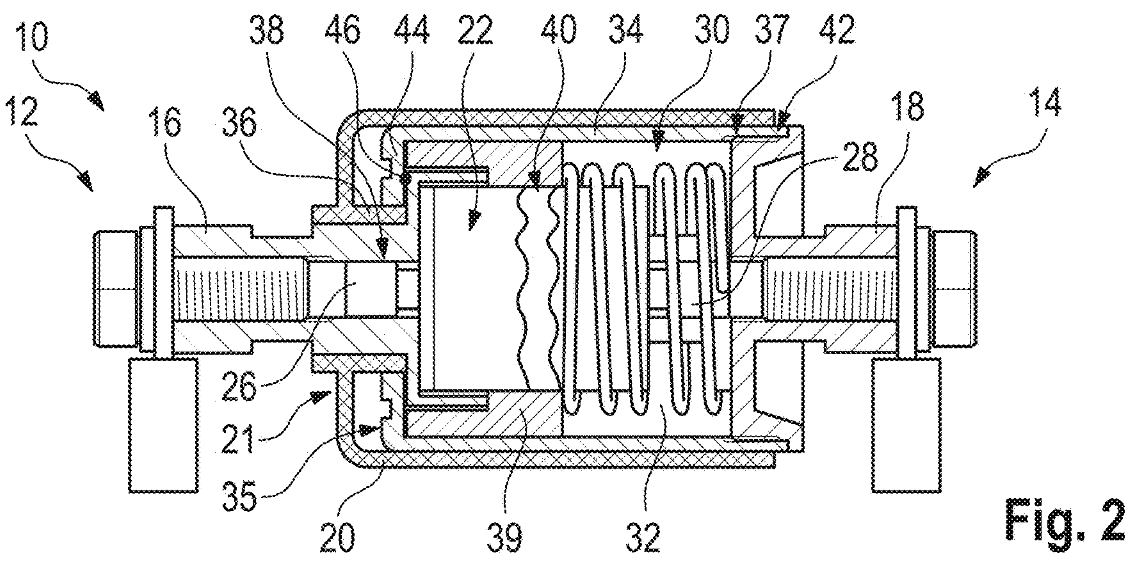
FIG. 2 shows the sectional view of FIG. 1 in the event of tripping.
Figure 3:
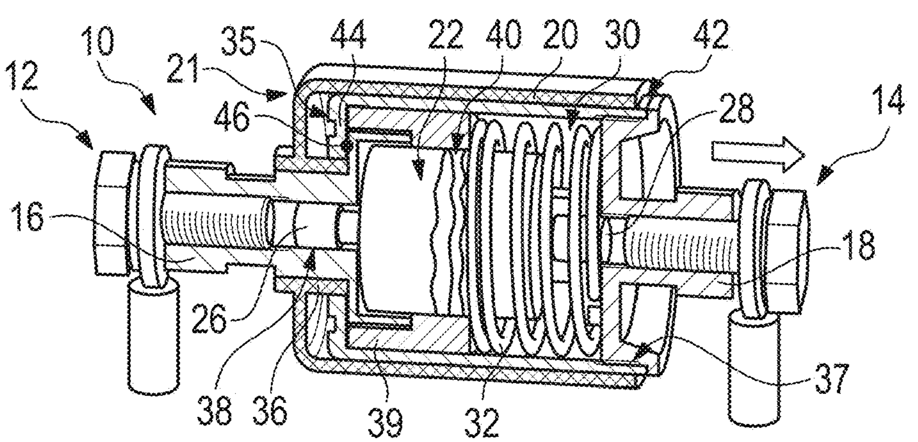
FIG. 3 shows a perspective view of FIG. 2.

FIGS. 2 and 3 show the tripping case of the short-circuiting device 30, which occurs in the event of a fault in the assembly 10.

In the example shown, the base body 24 has been damaged or destroyed, as there is a corresponding point of fracture 40.

The damage or destruction of the base body 24 results in the compression spring 32, which is supported on the insulating body 39, moving the second connecting part 18 and thus the actuating element 34 connected to the second connecting part 18 relative to the outer housing 20.

This makes an area of the actuating element 34 visible, which acts as a fault indicator 42. The fault indicator 42 is therefore provided on an outwardly facing surface of the actuating element 34, which is visible from the outside in the event of tripping, as it protrudes laterally from the outer housing 20 in the embodiment shown. It is therefore a mechanical fault indicator 42, as this becomes visible due to a mechanism.

In particular, it can be seen from FIG. 3 that the fault indicator 42 can be highlighted, for example in color as a red section, so that the state of the assembly 10 can be quickly detected, since it is a signal color. The fault indicator 42 can also be formed by a symbol or similar on the outwardly facing surface of the actuating element 34.

In principle, the fault indicator 42 can therefore be a marked section of the actuating element 34.

The relative movement of the actuating element 34 with respect to the outer housing 20 also results in the actuating element 34 contacting the first connecting part 16 with a short-circuit section 44, so that there is a short-circuit 46 between the first connecting part 16 and the actuating element 34, which is firmly connected to the second connecting part 18. The short-circuit section 44 is formed in particular on the bottom 35 of the pot-shaped actuating element 34.

In this respect, the two connecting parts 16, 18 are electrically connected to each other via the actuating element 34, in particular the short-circuit section 44 thereof, in the event of tripping, which ensures potential equalization in the event of a fault in the assembly 10.

The destruction or breakage of the base body 24 is typically caused by a short-term high overload acting on the assembly 10. In principle, the point of fracture 40 can occur at any point of the gas discharge arrester 22, i.e. also at the first end 26 or at the second end 28 or at another point of the base body 24. In each of these cases, movement of the second connecting part 18 and the actuating element 34 connected thereto relative to the first connecting part 16 is enabled.

In addition to this fault scenario, the short circuit device 30 comprises a further fault scenario due to which the assembly 10, in particular the short circuit device 30 trips, namely a long-term overload.

The long-term overload results in a detaching of the thermally detachable connection 38, as a result of which the gas discharge arrester 22 is no longer firmly coupled to the first connecting part 16 via its first end 26.

The spring 32, which is supported on the insulating body 39, thus presses the second connecting part 18 in the direction of the tripping position, as a result of which both the actuating element 34, which is firmly connected to the second connecting part 18, and the entire gas discharge arrester 22 are moved. This is possible because the gas discharge arrester 22 is no longer connected to the first connecting part 16 via its first end 26, as the thermally detachable connection 38 has been detached due to the permanent current flow and the associated temperature rise.

Accordingly, the fault indicator 42 is also visible from the outside in this fault scenario, allowing the user to quickly determine the state of the assembly 10.

Figure 4:
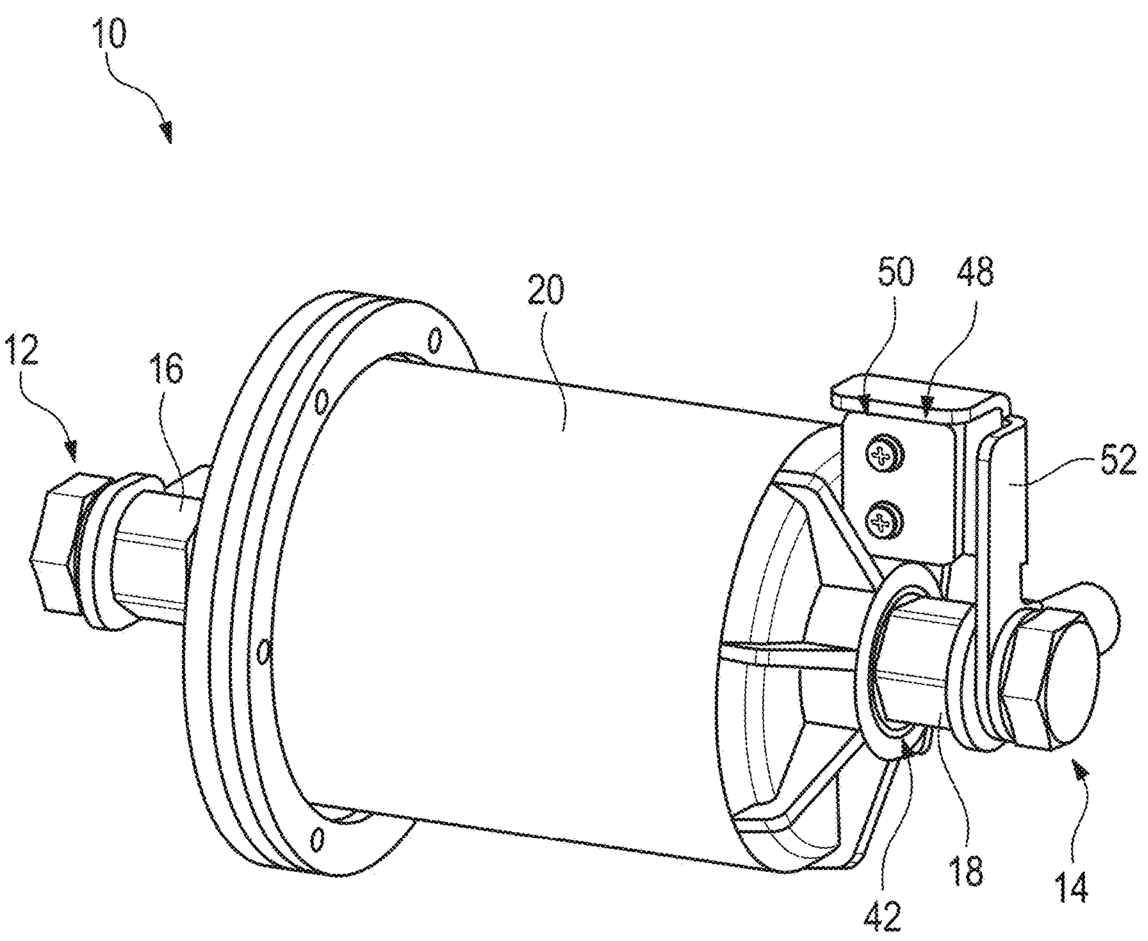
FIG. 4 shows a representation of an assembly according to the present disclosure in accordance with a second embodiment.

FIG. 4 shows a further embodiment in which the assembly 10 has a remote signaling equipment 48 comprising a sensor 50, for example a microswitch.

The sensor 50 is assigned to the second pole 14 of the assembly 10, for example the field-side pole of the assembly 10.

In the example embodiment shown, the sensor 50 interacts both with the outer housing 20 and with the second connecting part 18, on which a holding device 52 for the sensor 50 is provided.

The sensor 50 is arranged such that it is permanently in the switched or actuated state. In a tripping event of the short-circuiting device 30, the second connecting part 18 moves into the tripping position due to the relative movement with respect to the outer housing 20, as described above, as a result of which the holding device 52 and the sensor 50 arranged thereon are also moved. The sensor 50 is then no longer actuated by the outer housing 20, as a result of which the remote signaling equipment 48 outputs a different signal or no signal at all. In either case, there is a signal change which is attributable to a change in the state of the assembly 10.

Alternatively, it may be provided that the sensor 50 is arranged such that the sensor 50 is only actuated or tripped in case of a relative movement. The relative movement results in a mechanical actuation of the sensor 50, which signals a change in the state of the assembly 10.

In addition, the remote signaling means 48 can have an inductive sensor 50 which does not mechanically detect a movement of a component of the assembly 10.

In addition to the remote signaling equipment 48, the second embodiment also comprises the fault indicator 42, as the second pole 14 moves relative to the outer housing 20 in the event of tripping, so that the fault indicator 42 becomes visible, as has already been described above for the first embodiment.

In principle, the remote signaling equipment 48 can also be implemented in the first embodiment.

FIGS. 5 to 7 show a third embodiment of the assembly 10, which differs from the embodiment shown in FIG. 1 in that, in addition to the compression spring 32, the short-circuiting device 30 also has a torsion spring 54, which causes the actuating element 34 to rotate, which produces the short circuit between the actuating element 34 and the first connecting part 16, as can be seen from a comparison of FIGS. 6 and 7.

The basic structure is thus initially similar to the first embodiment shown in FIGS. 1 to 3, as in the event of tripping, the compression spring 32 enables a relative movement of the actuating element 34 to the outer housing 20 and the first connecting part 16, which is firmly connected thereto, in the axial direction.

As soon as the actuating element 34 has been moved far enough in the axial direction, the torsion spring 54 becomes active, initiating a rotational movement of the actuating element 34, which results in the actuating element 34 coming into contact with the first connecting part 16, thus creating the short circuit.

The compression spring 32 can also be provided to separate the gas discharge arrester 22, in particular the base body 24 thereof, if only a weakening was previously present. The force exerted by the compression spring 32 thus ensures that an existing weakening, for example a crack in the base body 24, leads to a separation of the base body 24. This ensures that the rotation can then take place by means of the torsion spring 54.

The corresponding rotary movement of the actuating element 34 is indicated in FIG. 6 by the dashed arrows, whereas the short-circuit position of the actuating element 34 is shown in FIG. 7, i.e. when the short-circuit is established, as the actuating element 34 and the first connecting part 16 are in contact.

In addition, the third embodiment of the assembly 10 comprises a fixing sheath part 56, which is provided between the outer housing 20 and the first connecting part 16, the insulating body 39, the actuating element 34 and the second connecting part 18.

In addition, a bearing sleeve 58 is provided on the gas discharge arrester 22, which serves to support the torsion spring 54.

In the embodiment, a viewing window may be provided in the fixing sheath part 56 and/or in the outer housing 20, via which the fault indicator 42 is visible from the outside in the event of tripping. In other words, the rotational movement of the actuating element 34 results in the fault indicator 42 being visible from the outside.

Alternatively, a variant embodiment can also be provided in which only the torsion spring 54 is present. As soon as the gas discharge arrester 22 is separated due to damage, a relative rotation can be initiated by the torsion spring 54, which leads to a short circuit, as already explained above.

Accordingly, all embodiments have in common that the assembly 10 comprises a gas discharge arrester 22 and a short-circuiting device 30, which comprises at least one spring 32, 54 and an actuating element 34, which is preloaded into a short-circuit position by the spring 32, 54. The gas discharge arrester 22 has a base body 24 filed with a gas, which is connected to the first connecting part 16 via the thermally detachable connection 38. The fault indicator 42 is set up to indicate the tripping event of the short-circuiting device 30.

The remote signaling equipment 48 can be provided in all embodiments.

The invention claimed is:

1. An assembly for potential equalization in potentially explosive areas, having an outer housing, a gas discharge arrester, a short-circuiting device and a fault indicator, at least the gas discharge arrester and the short-circuiting device being accommodated in the outer housing, the short-circuiting device comprising at least one spring and an actuating element, which is preloaded into a short-circuit position by the spring, the gas discharge arrester having a base body which is filled with a gas and connected to a first connecting part via a thermally detachable connection, and the fault indicator being set up to indicate a tripping event of the short-circuiting device.

2. The assembly according to claim 1, wherein the actuating element is mounted so as to be movable relative to the outer housing.

3. The assembly according to claim 1, wherein the actuating element is connected to a second connecting part.

4. The assembly according to claim 3, wherein the actuating element is screwed to the second connecting part.

5. The assembly according to claim 3, wherein the at least one spring acts on the second connecting part.

6. The assembly according to claim 1, wherein the at least one spring is a compression spring.

7. The assembly according to claim 1, wherein the short-circuiting device comprises a compression spring and a torsion spring.

8. The assembly according to claim 1, wherein, in the event of tripping of the short-circuiting device, a short circuit is formed via the first connecting part and the actuating element, which contact each other in the event of tripping.

9. The assembly according to claim 1, wherein the fault indicator is designed as a mechanical fault indicator.

10. The assembly according to claim 1, wherein the fault indicator is provided on an outwardly facing surface of the actuating element, which is visible from the outside in the event of tripping.

11. The assembly according to claim 1, wherein the first connecting part is firmly connected to the outer housing.

12. The assembly according to claim 1, wherein the base body is at least partially surrounded by an insulating body, on which the at least one spring is supported and/or along which the actuating element is movably mounted and/or to which the first connecting part is firmly connected.

13. The assembly according to claim 1, wherein the assembly comprises a remote signaling equipment which is set up to monitor the state of the assembly.

14. The assembly according to claim 13, wherein the remote signaling equipment comprises a sensor which interacts with the outer housing or the actuating element.

15. The assembly according to claim 1, wherein the thermally detachable connection is a soldered connection.

16. The assembly according to claim 1, wherein the base body of the gas discharge arrester is formed from a ceramic.

17. The assembly according to claim 1, wherein the outer housing is a plastic housing.

* * * * *